(12) United States Patent
Wang et al.

(10) Patent No.: US 8,515,710 B2
(45) Date of Patent: Aug. 20, 2013

(54) ON-BOARD DIAGNOSTICS OF TEMPERATURE SENSORS FOR SELECTIVE CATALYST REDUCTION SYSTEM

(75) Inventors: Yue-Yun Wang, Troy, MI (US); Yongsheng He, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 479 days.

(21) Appl. No.: 12/404,400

(22) Filed: Mar. 16, 2009

(65) Prior Publication Data

US 2010/0235141 A1 Sep. 16, 2010

(51) Int. Cl.
*G06F 11/30* (2006.01)
*G21C 17/00* (2006.01)
*G01K 1/08* (2006.01)
*G01K 1/14* (2006.01)
*G01K 13/00* (2006.01)

(52) U.S. Cl.
USPC ............................................ 702/183; 374/144

(58) Field of Classification Search
USPC ............. 702/183; 324/500, 527, 531; 374/1, 374/102, 110, 112, 115, 137, 141, 144; 73/114.01; 60/127
See application file for complete search history.

(56) References Cited

U.S. PATENT DOCUMENTS

| | | | |
|---|---|---|---|
| 7,857,508 B2* | 12/2010 | Foerstner et al. | 374/145 |
| 2005/0102076 A1* | 5/2005 | Kariya et al. | 701/34 |
| 2007/0047616 A1* | 3/2007 | Izumiura et al. | 374/144 |
| 2008/0151964 A1* | 6/2008 | Hagen et al. | 374/152 |
| 2009/0003405 A1* | 1/2009 | Corbet et al. | 374/1 |

FOREIGN PATENT DOCUMENTS

| | | |
|---|---|---|
| DE | 101 12 139 A1 | 9/2002 |
| DE | 10 2004 054 107 A1 | 6/2005 |

* cited by examiner

*Primary Examiner* — Alexander H Taningco
*Assistant Examiner* — Manuel Rivera Vargas

(57) ABSTRACT

Methods and systems for detecting faults in temperature sensors on engine systems provided with equipment for treatment of combustion products of an exhaust effluent stream during engine operation include determining sensor faults from differences in temperature between sensors present in such systems over time. Estimated exhaust gas temperatures may be compared against real time temperature measurements to arrive at a diagnostic residual value representing the difference between a modeled value and measured value, and deviation of the measured value from the modeled value is used to indicate a sensor fault.

19 Claims, 3 Drawing Sheets

$$\dot{T}_o = f(T_i, \dot{m}_{exh}, T_{amb}, V_s, SCR\ geometry)$$

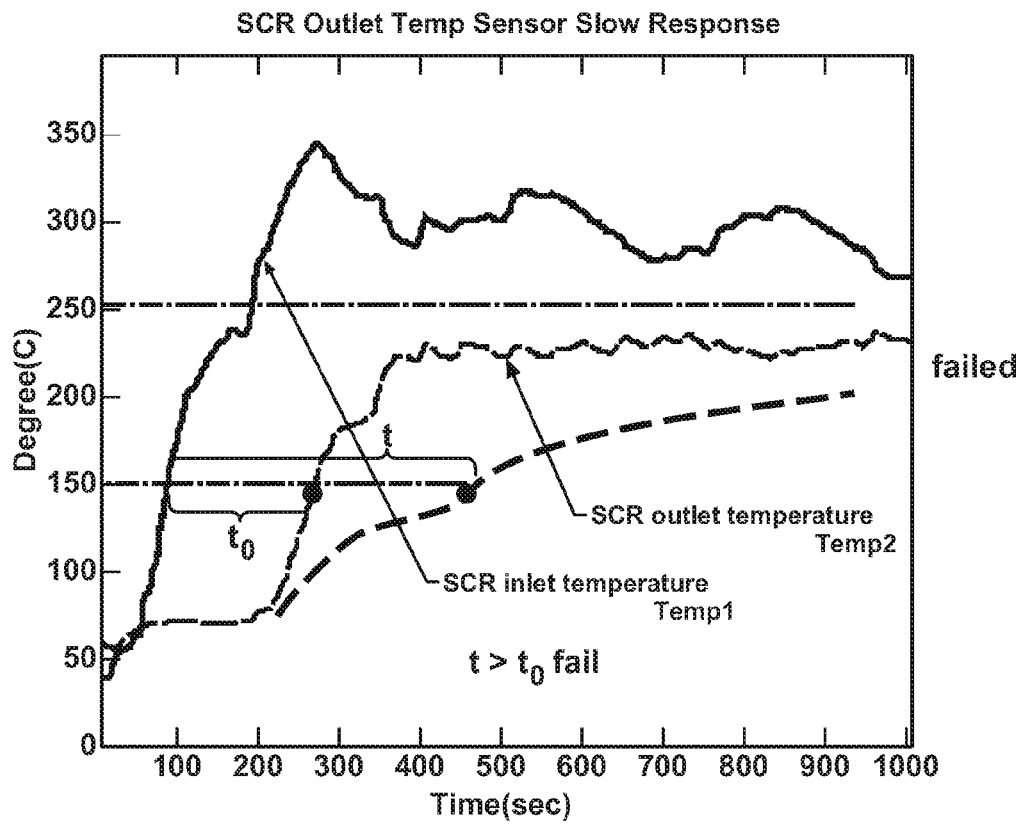
FIG. 3
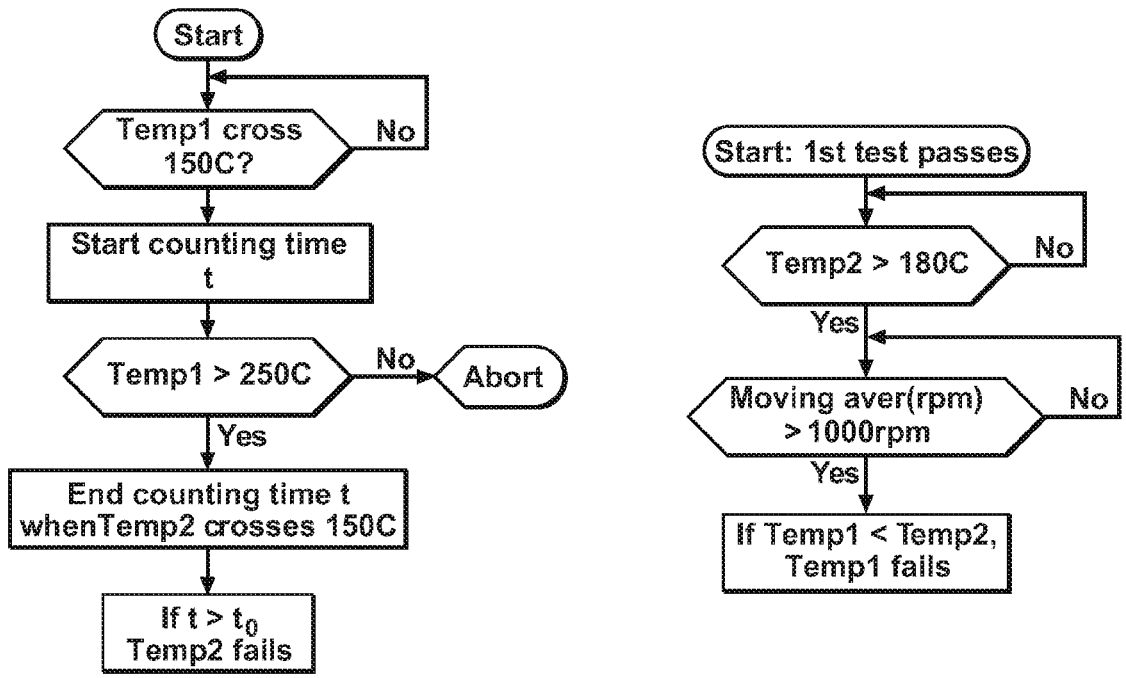
FIG. 4
FIG. 5

ON-BOARD DIAGNOSTICS OF TEMPERATURE SENSORS FOR SELECTIVE CATALYST REDUCTION SYSTEM

TECHNICAL FIELD

The present disclosure generally relates to diagnostics for engine systems equipped with various sensors.

BACKGROUND

The statements in this section merely provide background information related to the present disclosure and may not constitute prior art.

Modern combustion engines are known to be equipped with control systems for controlling their operation, including their performance characteristics and treatment of effluent exhaust gas streams emanating from such engines. Such control over engine operation and exhaust gas streams are made largely possible by placement of various types of sensors about the engines, which sensors have outputs that are routed as inputs to control modules which in turn are in operative control with various engine control means, including, inter alia, fuel delivery systems, exhaust gas recirculation systems, and air injector reactor systems.

Due to the nature of sensors in general, it sometimes occurs that one or more sensors disposed about an engine may experience an erosion in operating efficacy, degradation of performance, and even failure rendering them unusable for their intended purpose. Failure of sensors can happen while an operator is operating a motorized vehicle in which such engines are disposed and used as a motive means of power.

SUMMARY

A combination includes a combustion engine having an exhaust gas treatment system that includes a catalyst chamber, an upstream temperature sensor disposed in effective sensing contact with engine exhaust gases present prior to their entry into the catalyst chamber, and a downstream temperature sensor disposed in effective sensing contact with treated engine exhaust gases exiting the catalyst chamber. A method for identifying a fault in a temperature sensor present in the combination includes providing a first specified temperature and a second specified temperature, providing a diagnostic time period, providing a critical difference value, providing a timeout value, operating the engine, determining a first point in time that the temperature of the upstream temperature sensor reaches the first specified temperature, determining a second point in time that the temperature of the upstream temperature sensor reaches the second specified temperature, determining a third point in time at which the temperature reading provided by the downstream temperature sensor reaches the first specified temperature, determining a time interval representing the amount of time elapsed between the first point in time and the third point in time, determining the difference between the time interval and the diagnostic time period, and indicating a fault condition for said downstream temperature sensor upon occurrence of at least one of the events selected from the group consisting of the difference between the time interval and the diagnostic time period is greater than the critical difference value, and the downstream temperature sensor does not reach the first specified temperature prior to the elapse of an amount of time equal to the timeout value as measured from the first point in time.

BRIEF DESCRIPTION OF THE DRAWINGS

One or more embodiments will now be described, by way of example, with reference to the accompanying drawings, in which:

FIG. 3 graphically illustrates variance in temperature measured by sensors as an engine begins operation, in accordance with the present disclosure;

FIG. 4 provides a flowchart of an exemplary process, in accordance with the present disclosure;

FIG. 5 provides a flowchart of an exemplary process, in accordance with the present disclosure.

DETAILED DESCRIPTION

Figure 1:
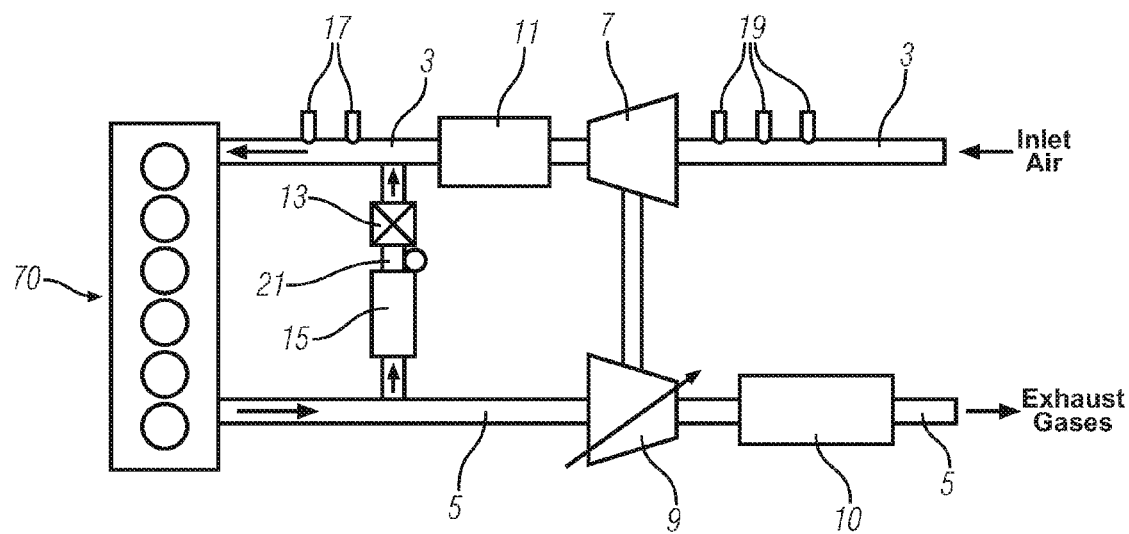
FIG. 1 is a schematic view of a combustion engine and accessories associated with its operation, in accordance with the present disclosure.

Referring now to the drawings, which are provided for the purpose of illustrating exemplary embodiments only and not for the purpose of limiting the same, FIG. 1 shows a schematic view of a combustion engine 70 comprising pistons and cylinders, and accessories associated with its operation, according to one embodiment of the disclosure. The combustion engine may be either a spark-ignition engine or a compression-ignition engine, and in preferred embodiments is piston-driven. An air inlet conduit 3 passes ambient air on its way to one or more engine cylinders. An exhaust gas conduit 5 passes exhaust gases from the combustion engine 70 when expelled during its normal operation. In some embodiments, a compressor 7 is provided to compress the inlet air, thus increasing its density to provide a higher concentration of oxygen in the air fed to the engine. The compressor 7 may be shaft-driven by a turbine 9 that is disposed in the exhaust gas conduit, as is known in the art of turbo charging. In one embodiment, recirculation of exhaust gases is effected by means of a selectively-actuable valve 13 disposed in a conduit 21 provided between the air inlet conduit 3 and the exhaust gas conduit 5. In such embodiments, a cooler 15 is preferably provided to reduce the temperature of the re-circulated exhaust gases prior to their being mixed with air being admitted through the air inlet conduit 3. A compressed air cooler 11 is preferably provided on the high-pressure side of compressor 7, when present, to dissipate some of the heat resulting from compression of the inlet air. In preferred embodiments, an aftertreatment system 10 is disposed between an exhaust manifold of the engine 70 and the point on the exhaust gas conduit 5 at which exhaust gases are released to the atmosphere. In one embodiment, the aftertreatment system 10 includes an oxidation catalyst, a particulates filter, and a nitrogen oxides ("NOx") selective catalytic reduction system ("SCR"). While the various components described above are depicted in schematic view, it is appreciated by those having ordinary skill in the art that many of the elements described, including the air inlet conduit and exhaust gas conduit, may be provided by integral castings, such as intake and exhaust manifolds which comprise one or more of such components, to the extent that such configurations are generally known in the art. In one embodiment, the engine 70 is a compression-ignition engine, operating using diesel fractions, oils, or esters such as "biodiesel" as fuel. In another embodiment, the engine 70 is a spark-ignition engine, operated using gasoline, ethanol, mixtures thereof, or other normally-liquid hydrocarbons and oxygenates as fuel.

Operation of engine 70 may be beneficially controlled by providing sensors 17 and sensors 19 at the depicted general locations along the air inlet conduit 3 shown in FIG. 1. Suitable as sensors 17 include without limitation such sensors as air inlet pressure and temperature sensors, which are useful to measure intake manifold temperature and pressure. Suitable as sensors 19 include without limitation such sensors as mass airflow rate sensors, ambient air temperature sensors, and ambient air pressure sensors. In preferred embodiments, the various sensors present provide inputs to at least one control module operatively connected to various devices useful for controlling combustion and engine operation, including without limitation compressor boost pressure, exhaust gas recirculation, dosing of a reductant into an exhaust effluent stream, and in some cases, valve timing.

The control module is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the desired functions. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

Figure 2:
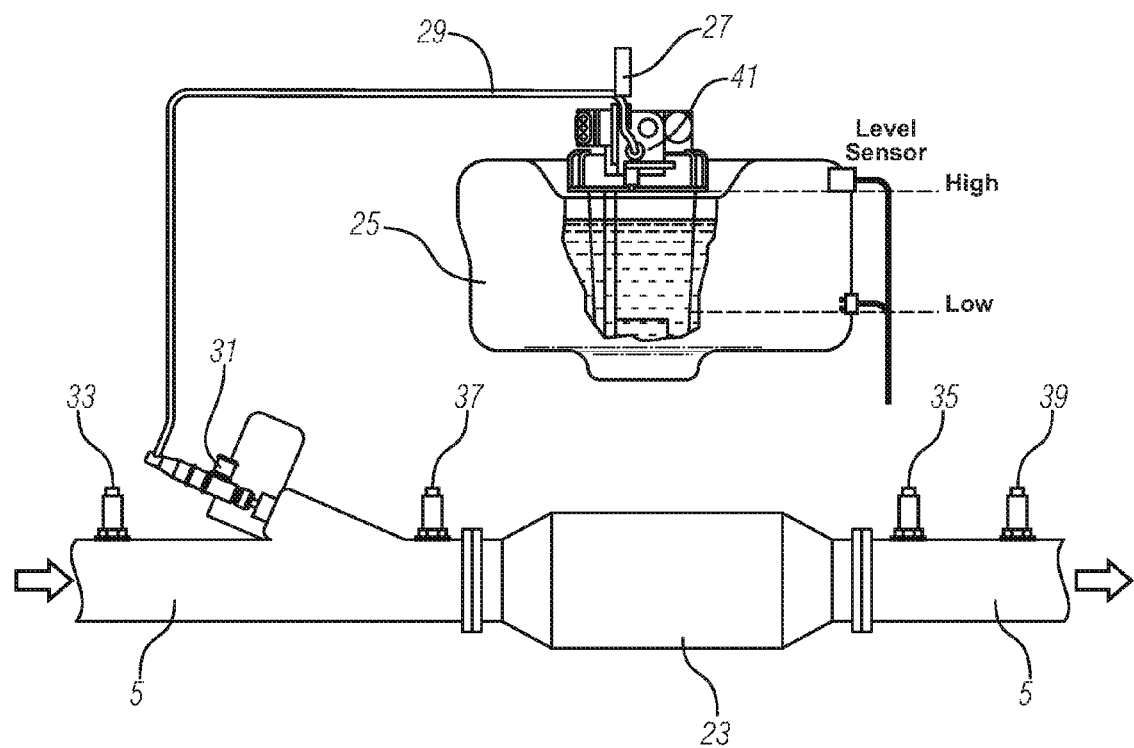
FIG. 2 shows a component system of an aftertreatment system accessory, in accordance with the present disclosure.

FIG. 2 shows a component system of an aftertreatment system 10 according to one embodiment of the disclosure. FIG. 2 shows an exhaust gas conduit 5 having a catalyst chamber 23 disposed as a segment along its length, the catalyst chamber 23 containing a reduction catalyst in either the form of a catalyst bed or monolithic material through which engine exhaust gases are caused to pass, in the direction indicated by arrows. An electronically-actuable dispenser 31 (of any type useful for controllably dispensing a liquid reductant from a conduit line within which a liquid reductant is maintained under pressure) is provided to the exhaust gas conduit 5 on the upstream side of catalyst chamber 23, to cause admixture of an administered liquid reductant with the flowing exhaust gases contained within exhaust gas conduit 5. In one embodiment the dispenser 31 is a solenoid-controlled valve. In a preferred embodiment, the liquid administered through dispenser 31 is contained within tank 25 and conveyed from tank 25 to dispenser 31 via conduit line 29, using pump 41 and line pressure sensor 27 to maintain the liquid pressure in conduit line 29 at a selected pressure, which may be any pressure between about 15 psig and about 150 psig, including all pressures and ranges of pressures therebetween. For convenience, tank 25 is provided with a level sensor.

Also shown in FIG. 2 are sensors 33, 35, which in a preferred embodiment are NOx sensors. NOx sensor 33 is disposed so its sensing element is in effective sensing contact with gases present in the exhaust gas conduit 5 on the upstream side of the catalyst chamber 23. NOx sensor 35 is disposed so its sensing element is in effective sensing contact with gases present in the exhaust gas conduit 5 on the downstream side of the catalyst chamber 23.

Temperature sensors 37, 39 are provided in a preferred embodiment. Temperature sensor 37 is disposed so its sensing element is in effective sensing contact with gases present in the exhaust gas conduit 5 on the upstream side of the catalyst chamber 23, and temperature sensor 39 is disposed so its sensing element is in effective sensing contact with gases present in the exhaust gas conduit 5 on the downstream side of the catalyst chamber 23. In preferred embodiments, the liquid contained in tank 25 and administered by dispenser 31 into the exhaust gas stream comprises a "liquid reductant", which is a substance capable of reducing nitrogen oxides present in the exhaust gas stream after they have emerged from engine 70 (FIG. 1). The reduction preferably occurs on the surface of a catalyst disposed in the catalyst chamber 23.

In one embodiment, the liquid reductant contained in tank 25 comprises an aqueous solution of urea. However, liquid compositions comprising other reductants, organic and inorganic, known in the art for reducing the nitrogen oxides content in the effluent exhaust gas stream from a combustion engine are useful as well. Such alternatives may comprise one or more materials whose molecular structure includes at least one nitrogen atom having at least one hydrogen atom attached to the nitrogen atom, including urea itself and organic-substituted ureas (collectively "a urea").

During one mode of operation of a combustion engine 70 shown and described in relation to FIG. 1 having accessories including the component system shown and described in relation to FIG. 2, the NOx sensors 33, 35 and the temperature sensors 37, 39 have outputs which are provided as inputs to at least one control module (not shown). This provides control of the operation of dispenser 31, to dispense effective nitrogen oxides reducing amounts of liquid from tank 25 into the exhaust gases present in the exhaust gas conduit 5 on the upstream side of the catalyst chamber 23, so as to reduce the amount of NOx present in the exhaust gases being so treated to a predetermined level. The quantities of NOx present in the exhaust gas conduit 5 both upstream and downstream of the catalyst chamber are derived from sensors 33, 35 and these quantities can be readily mathematically manipulated in a control module to determine, among other things, the difference in NOx content of an effluent gas generated by engine 70 both prior to and after treatment with a liquid reductant contained in tank 25, on a catalytic surface present in chamber 23.

Often, temperature sensors suffer from hardlimit failures, such as short or open circuits. These failure modes can be easily detected by monitoring sensor voltage. In-range failures, on the other hand, are more difficult to detect. One event which may occur is failure of a sensor, such as a temperature sensor 37 or 39. In one possible mode of failure, sensor 39 fails by providing an output indicative of a lower-than-actual temperature in the effluent gas stream on the downside of catalyst chamber 23, but still providing a signal and not experiencing a hardlimit failure. When the various sensors present are operatively connected to at least one control module which controls dispensation of liquid from tank 25 through dispenser 31 responsive at least in part to inputs including information from sensors 37 and 39, a falsely-low indication of temperature in the gases present at sensor 39 may cause more of the liquid from tank 25 to be dispensed, than ought otherwise be dispensed in order to maintain the NOx below a predetermined level. Similarly, a falsely-low indication of temperature in the gases present at sensor 37 may cause less of the liquid from tank 25 to be dispensed, resulting in less reduction of NOx than is desired.

According to one embodiment of this disclosure, the temperature reported by temperature sensor 39 is compared to that of upstream temperature sensor 37. The exhaust gas flow impacts the time lag of downstream temperature sensor 39 reaching a selected temperature target after sensor 37 has already reached the selected temperature. This is shown graphically in FIG. 3, which provides a curve showing typical variance in the temperature measured by sensor 37 as an engine begins operation, labeled SCR inlet temperature, Temp 1. A curve showing typical variance in the temperature measured by sensor 39 over the same interval of time is labeled SCR outlet temperature, Temp 2. During the course of an evaluation according to this embodiment, in general terms, if the upstream temperature sensor 37 warms up normally as compared to a number of previously-conducted test observations on the system, but the downstream temperature sensor 39 readings lag those of the upstream temperature sensor 37 by a predetermined amount of time, then a downstream temperature sensor 39 failure may be indicated. In one embodiment, when the upstream temperature sensor 37 reaches a first specified temperature, which in one non-limiting example is 150° centigrade, a time counter is started. Once the upstream temperature sensor 37 reaches a second specified temperature, which in one non-limiting example is 250° centigrade, then at that time, the temperature of the downstream temperature sensor 39 is considered. The amount of time elapsed between when upstream temperature sensor 37 achieves the first specified temperature and when downstream temperature sensor 39 achieves a specified temperature, which is preferably the first specified temperature, is recorded as T0. For a given engine/accessory configuration, T0 can be considered as being a diagnostic time period, which may be stored in computer memory that is part of the on-board control module. During actual operation of an engine system in field use, the same above time and temperature measurements are taken under operating conditions during which a diagnostic system according to this disclosure is enabled. In one embodiment the enabled operating conditions include, at engine startup, that the temperature sensed by sensor 37 is less than 100° centigrade, and the difference between Temp 2 and Temp 1 is less than a predetermined constant. For cases where the time required for the temperature sensed by sensor 39 to achieve the first specified temperature exceeds the diagnostic time period by a predetermined amount, which predetermined amount of time is termed the critical difference value, a fault in sensor 39 is caused to be indicated. In another embodiment, a fault in sensor 39 is also caused to be indicated for instances in which sensor 39 does not achieve an output representing the first specified temperature of 150° centigrade within a predetermined amount of time. For the latter fault-indicating instance, a timeout value representing an elapsed time may be, for example, an elapsed time between about three minutes and about ten minutes, including all amounts of time and ranges of times therebetween.

In a diagnostic procedure according to one embodiment, the measurement of time begins when an upstream temperature sensor reaches a first predetermined temperature. Then, the downstream temperature sensor is given a prescribed amount of time to achieve the same predetermined temperature as the upstream temperature sensor and if it does not achieve this predetermined temperature within the timeout period, a fault condition is indicated.

FIG. 3 includes a dashed line curve that represents the variance in temperature data outputted by temperature sensor 39, in one possible mode of failure of sensor 39. In the instance of the dashed line curve, the time required for the temperature sensed by sensor 39 to achieve 150° centigrade exceeds $T_0$, and a fault in sensor 39 would be indicated. One algorithm representative of such a process is provided in FIG. 4.

Although the foregoing has been detailed in reference to temperatures of 150° and 250° centigrade chosen as a first specified temperature and a second specified temperature, respectively, coinciding in time with events described, the present disclosure includes use of any particular specified temperatures chosen for various engine and component configurations at which these same events may occur. Determination of desirable specified temperatures for a given engine/exhaust system configuration may be readily made without undue experimentation using to the provisions of this disclosure for each of many possible different component capacities and configurations. The present disclosure includes embodiments in which the first specified temperature is any temperature in the range of between about 100° centigrade and about 200° centigrade, including all temperatures and ranges of temperatures therebetween, and in which the second specified temperature is any temperature in the range of between about 200° centigrade and about 300° centigrade, including all temperatures and ranges of temperatures therebetween.

In a second embodiment for identifying a fault in a sensor present in a combustion engine exhaust system combination as previously described, the temperature readings provided by the upstream temperature sensor 37 and downstream temperature sensor 39 are considered when enabling operating conditions for the test system are present. In one embodiment, if the temperature sensed by the downstream temperature sensor 39 is above a first pre-selected temperature, and the temperature sensed by the upstream temperature sensor 37 is below a second predetermined temperature (that may optionally include a variance amount), then failure of the upstream temperature sensor 37 is caused to be indicated. In one non-limiting example the first predetermined temperature is selected to be 250° centigrade and the second predetermined temperature is selected to be 250° centigrade; however, values for these predetermined temperatures can each independently be any temperature in the range of between about 150° centigrade and about 300° centigrade, including all temperatures and ranges of temperatures therebetween. A flowchart for the process of this second embodiment is depicted in FIG. 5.

Enabled operating conditions for the second embodiment include provision that the engine from which exhaust effluent gases are fed into the catalyst chamber 23 is not in a state of deceleration at the time of sensor evaluation. However, for cases where an engine is decelerating, eventually the engine will be caused to cease decelerating at some point in time, and it is preferable to provide a waiting period subsequent to cessation of deceleration, prior to initiation of a method according to the second embodiment. This waiting period is preferably about 30 seconds but may be any length of time between about 15 seconds and about two minutes. A further enabling condition, in preferred embodiments is that the engine be operating at a rate of at least a selected minimum level of r.p.m., which in one non-limiting example is 1000 r.p.m.; however, any appropriate predetermined minimum level of r.p.m. is useful, which may be as low as about 500 r.p.m.

In a third embodiment for identifying a fault in a sensor present in a combustion engine and exhaust system combination as previously described, a physical model is applied, to provide an estimate for the temperature of the engine exhaust gases on the downstream side of the catalyst using knowledge of the temperature of the engine exhaust gases on the upstream side of the catalyst, the flow rate of the engine exhaust gases, ambient temperature, and catalyst geometry. The estimated temperature provided is compared to the actual measured temperature provided by a temperature sensor, to generate a diagnostic residual value. For instances in which the diagnostic residual value is or becomes significantly greater in magnitude at some point in time with respect to its value at an earlier time, a fault indication is provided for either of the upstream temperature sensor 37 or downstream temperature sensor 39. In another embodiment, the residual is judged against a predetermined diagnostic value, and if the magnitude of the diagnostic residual value exceeds the diagnostic value, then indication of a fault is provided. A first step in providing such a modeled method includes definition of the heat transfer between engine exhaust gases and the wall of catalyst chamber 23, $\dot{T}_o$, as a function of variables as follows.

$$\dot{T}_o = f(T_i, \dot{m}_{exh}, T_a, V_s, \text{SCR geometry}) \quad [1]$$

in which $T_i$ represents the temperature of the engine exhaust gases on the inlet side of the catalyst chamber; $\dot{m}_{exh}$ represents mass airflow of the engine exhaust gases; Ta represents the ambient temperature; $V_s$, an optional parameter, represents exhaust gas flow space velocity; and SCR geometry relates to the geometry of the catalyst bed or monolith present in catalyst chamber 23. In one embodiment, the following set of equations are useful for providing modeled values of estimates for the temperature of the engine exhaust gases on the downstream side of the catalyst:

$$\dot{T}_o = \frac{1}{m \cdot f(t)} [\gamma \cdot \dot{m}_{exh} T_i - \gamma \cdot \dot{m}_{exh} T_o] - \frac{\dot{f}}{f} T_o - \frac{1}{fc_v} hS(f(t)T_o - T_w) \quad [2]$$

$$\dot{T}_w = \frac{1}{\tau}(hS(f(t)T_o - T_w) - h_0 S_0(T_w - T_a)) \quad [3]$$

$$T_b = f(t)T_o = f(t, \dot{m}_{ex}, T_i(0)) \cdot T_o \quad [4]$$

wherein m represents the exhaust mass stored in catalyst chamber 23; $T_b$ represents the catalyst bed temperature; $T_O$ represents the temperature of the engine exhaust gases on the downstream side of catalyst chamber 23; $f(t)$ defines a relation between $T_b$ and $T_O$ and is calibrated based on test cell data; $\gamma$ represents the specific heat of the exhaust gas; $f$ represents a scaled function; $\dot{f}$ represents the derivative of the function $f$; $C_v$ represents the specific heat at constant volume; h represents the catalyst surface heat transfer coefficient; S represents the lumped catalyst surface area which is defined as the total surface area contacting with the exhaust gas flow through the catalyst; $T_w$ represents the catalyst chamber wall temperature; $\dot{T}_w$ represents the first derivative of $T_w$; $\tau$ represents a heat transfer time constant; $H_0$ represents the catalyst chamber wall heat transfer coefficient; $S_0$ represents the equivalent wall surface area contacting with ambient air; t represents time history; and $T_i(0)$ represents the initial temperature measured from the first temperature sensor from the catalyst inlet.

Figure 6:
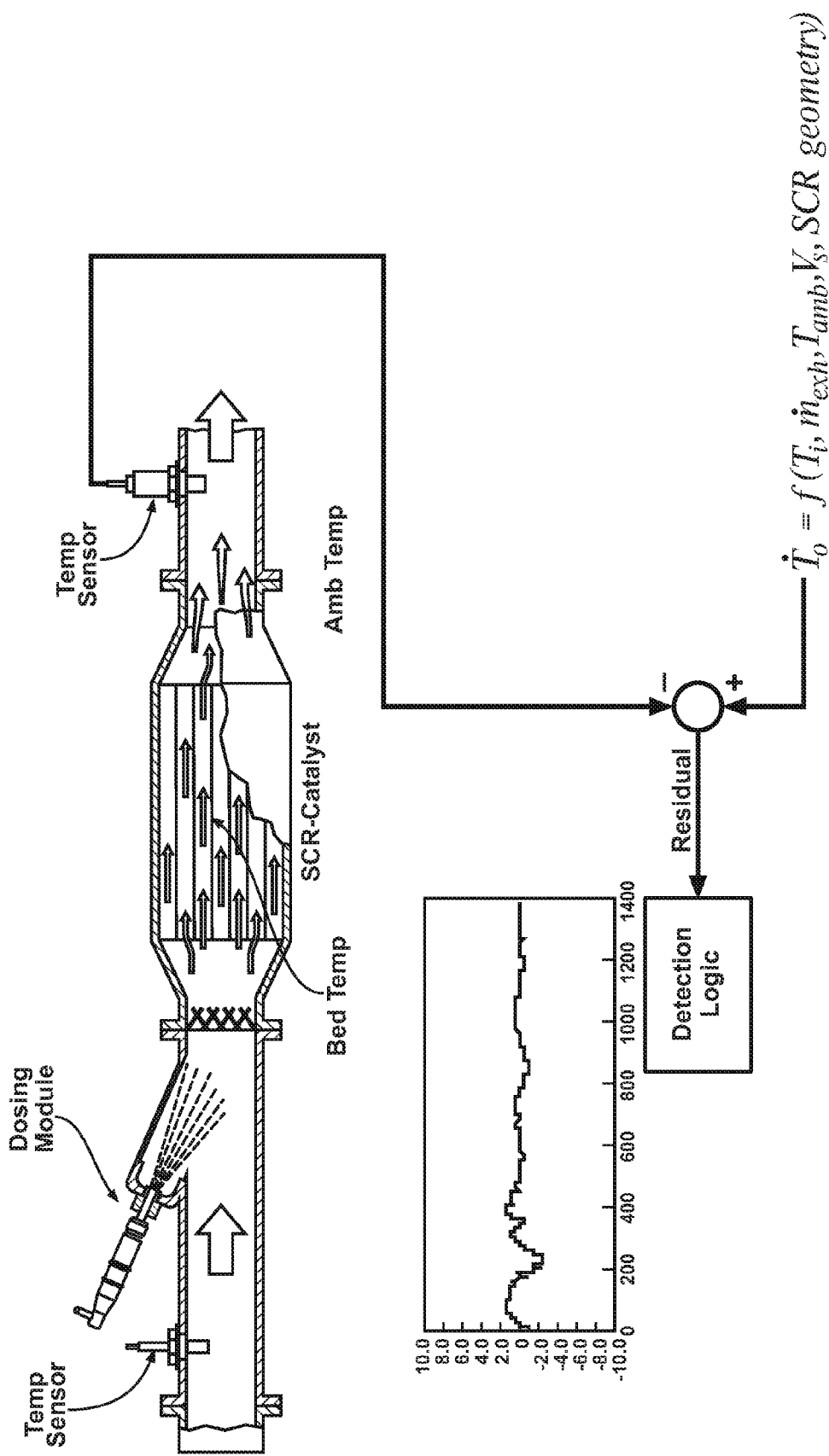
FIG. 6 provides a diagram of a general process scheme, in accordance with the present disclosure.

The model-derived estimate of the temperature of the exhaust gases on the downstream side of catalyst chamber $T_O$ is obtained using various sensors known in the art to provide the above-acquirable data in real time and applying the mathematical model described using a control module to provide outputs that comprises an estimate of the temperature $T_O$ of the exhaust gases on the downstream side of the catalyst chamber over time. These outputs are compared to actual measured value of the temperature provided over time, and if the difference between the measured value of a temperature sensor and that provided by the model is greater than a predetermined threshold, then a fault is indicated in one of sensors 37, 39 as appropriate. A general diagram of such a scheme is provided in FIG. 6.

The outputs of various sensors are referred to in this disclosure but it shall be understood that the outputs of such sensors may be in millivolts, ohms, or any other measurable signal output capable of being transduced into an indication of temperature, nitrogen oxides content or other desired quantity using generally-known methods. In preferred embodiments, data acquisition and manipulation is provided using computer memory, at least one control module, and conventional relaying circuitry and logic.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for identifying a fault in a temperature sensor present in a combination comprising a combustion engine having an exhaust gas treatment system that includes a catalyst chamber, said system including an upstream temperature sensor disposed in effective sensing contact with engine exhaust gases present prior to their entry into said catalyst chamber, and a downstream temperature sensor disposed in effective sensing contact with treated engine exhaust gases exiting said catalyst chamber, said method comprising:
    providing a first specified temperature and a second specified temperature;
    providing a diagnostic time period;
    providing a critical difference value;
    providing a timeout value;
    operating said engine;
    determining a first point in time that the temperature of said upstream temperature sensor reaches said first specified temperature;
    determining a second point in time that the temperature of said upstream temperature sensor reaches said second specified temperature;
    determining a third point in time at which the temperature reading provided by said downstream temperature sensor reaches said first specified temperature;
    determining a time interval, representing the amount of time elapsed between said first point in time and said third point in time;
    determining the difference between said time interval and said diagnostic time period; and
    indicating a fault condition for said downstream temperature sensor upon occurrence of at least one of the events selected from the group consisting of: the difference between said time interval and said diagnostic time period is greater than said critical difference value; and said downstream temperature sensor does not reach said first specified temperature prior to the elapse of an amount of time equal to said timeout value, as measured from said first point in time.

2. Method according to claim 1 wherein said first specified temperature is any temperature in the range of between about 100° centigrade and about 200° centigrade, including all temperatures and ranges of temperatures therebetween.

3. Method according to claim 2 wherein said first specified temperature is about 150° centigrade.

4. Method according to claim 1 wherein said second specified temperature is any temperature in the range of between about 200° centigrade and about 300° centigrade, including all temperatures and ranges of temperatures therebetween.

5. Method according to claim 4 wherein said second specified temperature is about 250° centigrade.

6. Method according to claim 1 wherein said timeout value is any amount of time between about three minutes and about ten minutes, including all amounts of time and ranges of times therebetween.

7. Method according to claim 1 wherein the temperature of said upstream temperature sensor is at any temperature that is less than about 100° centigrade prior to carrying out said method.

8. Method for identifying a fault in a temperature sensor present in a combination comprising a combustion engine having an exhaust gas treatment system that includes a catalyst chamber, said system including an upstream temperature sensor disposed in effective sensing contact with engine exhaust gases present prior to their entry into said catalyst chamber, and a downstream temperature sensor disposed in effective sensing contact with treated engine exhaust gases exiting said catalyst chamber, said method comprising:
   providing a first predetermined temperature and a second predetermined temperature;
   operating said engine;
   determining the temperatures sensed by said downstream temperature sensor and said upstream temperature sensor;
   comparing the temperature sensed by said downstream temperature sensor with said first predetermined temperature;
   comparing the temperature sensed by said upstream temperature sensor with said second predetermined temperature;
   determining a failure condition to be present in said upstream temperature sensor when the temperature sensed by said downstream temperature sensor is above said first predetermined temperature and the temperature sensed by said upstream temperature sensor is below said second predetermined temperature.

9. Method according to claim 8 wherein said method is conducted when said engine is not decelerating.

10. Method according to claim 9 wherein said method is conducted when said engine has not been decelerating for at least any amount of time in the range of between about 15 seconds and about two minutes, including all amounts of time and all ranges of times therebetween.

11. Method according to claim 8 wherein said first predetermined temperature and said second predetermined temperature are each independently any temperature in the range of between about 150° centigrade and about 300° centigrade, including all temperatures and ranges of temperatures therebetween.

12. Method according to claim 8 wherein said method is conducted when said engine is operating at an r.p.m. that is at least above about 500 r.p.m.

13. Method according to claim 8 wherein said method is conducted when said engine is operating at an r.p.m. that is at least above about 900 r.p.m.

14. Method according to claim 8 wherein said first predetermined temperature is about 250° centigrade and wherein said second predetermined temperature is about 250° centigrade.

15. Method for identifying a fault in a temperature sensor present in a combination comprising a combustion engine having an exhaust gas treatment system that includes a catalyst chamber, said system including an upstream temperature sensor disposed in effective sensing contact with effluent engine exhaust gases present prior to their entry into said catalyst chamber, and a downstream temperature sensor disposed in effective sensing contact with treated engine exhaust gases exiting said catalyst chamber, said method comprising:
   providing an estimated temperature of the effluent engine exhaust gases on the downstream side of said catalyst chamber independent of actual temperature of the effluent engine exhaust gases on the downstream side of said catalyst chamber during engine operation, based on data including a temperature of the effluent engine exhaust gases on the upstream side of the catalyst, a flow rate of the effluent engine exhaust gases, an ambient temperature, an effluent exhaust gas flow space velocity, and a catalyst geometry, said catalyst geometry comprising a total surface area of said catalyst chamber contacting with the effluent engine exhaust gases through said catalyst chamber and a wall surface area of said catalyst chamber contacting with ambient air;
   determining an actual temperature of the effluent engine exhaust gases on the downstream side of said catalyst chamber from said downstream temperature sensor during engine operation;
   calculating a diagnostic residual value based on the difference between said actual temperature and said estimated temperature;
   comparing said diagnostic residual value to a diagnostic value; and
   determining a fault condition to be present in a temperature sensor in the event that the magnitude of the diagnostic residual value exceeds said diagnostic value.

16. Method according to claim 15 wherein said diagnostic residual value is a measurement of temperature difference and is less than about 20° centigrade.

17. Method according to claim 15 wherein said determining and calculating are carried out in a control module.

18. Apparatus for identifying a fault in a temperature sensor present in a combination comprising a combustion engine having an exhaust gas treatment system that includes a catalyst chamber, said system including an upstream temperature sensor disposed in effective sensing contact with engine exhaust gases present prior to their entry into said catalyst chamber, and a downstream temperature sensor disposed in effective sensing contact with treated engine exhaust gases exiting said catalyst chamber, said apparatus comprising:
   a plurality of sensors disposed in effective sensing contact on said combination, said sensors including at least one temperature sensor; and
   at least one control module configured to receive inputs from said plurality of sensors and to
      monitor sensor-derived first temperature data concerning exhaust gases present at a first location in said system prior to their entry into said catalyst chamber over time comprising a first point in time that a temperature at said first location reaches a specified temperature,
      generate data comprising a second point in time concerning a second temperature value relating to said system reaching said specified temperature said second temperature value is provided by a second temperature sensor disposed at a second location in said system in effective sensing contact with treated engine exhaust gases exiting said catalyst chamber,
      compare said first temperature data with said second temperature data to determine a time interval representing the amount of time elapsed between said first point in time and said second point in time, determine a difference between said time interval and a diagnostic time period, and indicate a fault in the second temperature sensor when the difference between said time interval and said diagnostic time period differs by more than a predetermined critical difference value.

19. Apparatus according to claim 18 wherein said second temperature value is provided by a computer model that generates virtual sensor temperature data as a function of monitored engine operating parameters.

* * * * *